(12) United States Patent
Jimenez et al.

(10) Patent No.: US 6,579,832 B2
(45) Date of Patent: Jun. 17, 2003

(54) METHOD FOR TREATING DRILLING FLUID USING NANOPARTICLES

(75) Inventors: Maria Alejandra Jimenez, La Sierroi Torrets F (VE); Luis Carlos Genolet, Custequst (VE); Juan Carlos Chavez, La Sierroi Torrets F (VE); Douglas Espin, Canacas (VE)

(73) Assignee: Intevep S.A., Caracas (VE)

( * ) Notice: Subject to any disclaimer, the term of this patent is extended or adjusted under 35 U.S.C. 154(b) by 116 days.

(21) Appl. No.: 09/797,741

(22) Filed: Mar. 2, 2001

(65) Prior Publication Data

US 2002/0123431 A1 Sep. 5, 2002

(51) Int. Cl.$^7$ .................................................. C09K 7/00
(52) U.S. Cl. ..................... 507/143; 507/906; 175/66; 175/65
(58) Field of Search ................ 507/906, 143, 507/270; 175/65, 66

(56) References Cited

U.S. PATENT DOCUMENTS

| | | | | |
|---|---|---|---|---|
| 1,663,492 A | * | 3/1928 | Chamberlin | 507/143 |
| 2,257,114 A | * | 9/1941 | Harth | 507/143 |
| 2,276,075 A | * | 3/1942 | Wuensch | 507/143 |
| 2,719,119 A | * | 9/1955 | Teichmann | 507/143 |
| 3,252,082 A | * | 5/1966 | Hiller | 507/143 |
| 4,519,922 A | * | 5/1985 | Sutton et al. | 507/143 |
| 4,971,709 A | * | 11/1990 | Tillis et al. | 507/143 |
| 5,944,195 A | * | 8/1999 | Huang et al. | 175/66 |

FOREIGN PATENT DOCUMENTS

WO   WO/98/22648   5/1998

* cited by examiner

Primary Examiner—Philip Tucker
(74) Attorney, Agent, or Firm—Bachman & LaPointe, P.C.

(57) ABSTRACT

A method for treating a drilling fluid is provided, which method includes the steps of providing a drilling fluid, providing a drilling fluid additive in the form of superparamagnetic nanoparticles, mixing the drilling fluid additive with the drilling fluid so as to provide a treated drilling fluid, and exposing the treated drilling fluid to a magnetic field so as to recover the superparamagnetic nanoparticles.

12 Claims, 1 Drawing Sheet

METHOD FOR TREATING DRILLING FLUID USING NANOPARTICLES

BACKGROUND OF THE INVENTION

The invention relates to a method for treating a drilling fluid and, more particularly, to a method for adjusting fluid density of a drilling fluid in a recoverable manner.

Drilling fluids are widely used in the petroleum industry during the drilling of wells to subterranean formations for production of hydrocarbons.

Drilling fluids are used for a number of purposes, including lubricating the drill bit, lifting rock cuttings to the surface and imparting a positive pressure against exposed formations so as to avoid influx of formation fluids into the well. The fluid density is directly related to the function of the fluid in imparting such positive pressure, as the density is the controlling factor in determining the weight of the drilling fluid column and the resulting hydrostatic pressure against the formation exposed by the well.

As different formations are encountered, and depth increases, drilling fluid density must frequently be adjusted to appropriately balance the system. Drilling fluid densities are typically adjusted from values between about 8.5 lb/gal (water) and about 15 lb/gal, and various powders and other additives are used for adjusting the density.

As fluid densities must be adjusted, drilling fluid must be adjusted by the addition of weighting material, repeated processes which can lead to a substantial amount of fluid and solid waste material. Of course, this is environmentally undesirable.

Further, such additions of additives take time and can result in significant delay before a new condition can be responded to with a change in density.

It is clear that the need remains for an improved method of adjusting drilling fluid density.

It is therefore the primary object of the present invention to provide a method for treating a drilling fluid which does not generate substantial amounts of solid and fluid waste material.

It is a further object of the present invention to provide such a method which is effective to produce a desired density change in a relatively short period of time whereby changing conditions can be rapidly responded to.

Other objects and advantages of the present invention will appear hereinbelow.

SUMMARY OF THE INVENTION

In accordance with the present invention, the foregoing objects and advantages have been readily attained.

According to the invention, a method is provided for treating a drilling fluid, which method comprises the steps of providing a drilling fluid; providing a drilling fluid additive comprising superparamagnetic nanoparticles; mixing said drilling fluid additive with said drilling fluid so as to provide a treated drilling fluid; and exposing said treated drilling fluid to a magnetic field so as to recover said superparamagnetic nanoparticles.

In accordance with a preferred aspect of the present invention, the fluid characteristic being adjusted is fluid density, and the superparamagnetic nanoparticles are substantially recovered for re-use in treating subsequent fluids.

BRIEF DESCRIPTION OF THE DRAWINGS

A detailed description of preferred embodiments of the present invention follows, with reference to the attached drawings, wherein.

DETAILED DESCRIPTION

The invention relates to a method for treating a drilling fluid and, more particularly, to a method for reversibly adjusting fluid density in a manner which is environmentally friendly and easily controlled.

In accordance with the present invention, the method involves treating a drilling fluid utilizing superparamagnetic nanoparticles, which can themselves be fluid quality adjusting additives, or which can serve as carrier for other fluid additives, and which are readily recoverable by exposing fluid including such nanoparticles to a magnetic field.

As used herein, the term superparamagnetic relates to a material which behaves in a magnetic fashion when exposed to a magnetic field, but which does not maintain any magnetic residual when the magnetic field is removed. Most metals when in nanoparticle sizes of less than or equal to 200 nm are superparamagnetic. Examples of particularly suitable materials include Group VIII metals (CAS version of the Periodic Table), Cd, Au, and alloys of these metals.

In one preferred embodiment of the present invention, the superparamagnetic nanoparticles are used as a drilling fluid additive for adjusting fluid density. As set forth above, this is frequently required in order to apply the appropriate amount of pressure to formations encountered during drilling so as to prevent formation fluids from invading the well.

Figure 1:
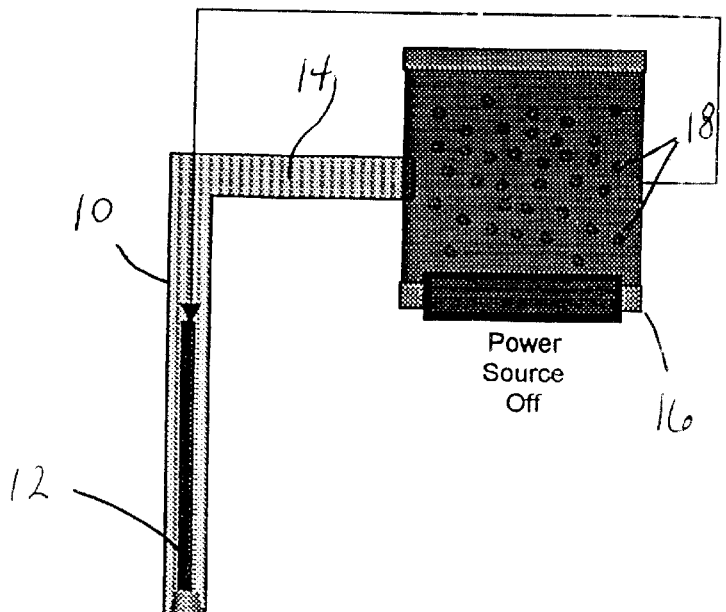
FIG. 1 illustrates a drilling operation using treated drilling fluid in accordance with the present invention.

FIG. 1 schematically illustrates a method in accordance with the present invention utilizing such superparamagnetic nanoparticles for increasing the density of the drilling fluid.

A standard drilling fluid is obtained, which may have a density between about 8.5 lb/gal and about 15 lb/gal, and a suitable quantity of clustered superparamagnetic nanoparticles are obtained and added to the drilling fluid. The clustered superparamagnetic nanoparticles are preferably added to the drilling fluid in amounts sufficient to generate the desired fluid density. Addition of the clustered nanoparticles provides the treated drilling fluid for use in drilling as desired and as shown in FIG. 1.

In accordance with the present invention, the treated drilling fluid is passed through an apparatus which can be used to generate a magnetic field through the fluid.

FIG. 1 shows well 10 containing drilling equipment 12 and drilling fluid 14. Drilling fluid is circulated at surface level through a magnetic field generator 16 and back through drilling equipment 12 for continued use and drilling.

Because of the changes in the formation pressure reached while drilling, mainly due to overburden and depositional mechanisms, mud weight should be adjusted as required. Accordingly, clusters of nanoparticle concentration will be raised or reduced at the surface to maintain the overpressure condition against the reservoir face. This should be carried out as many times as required during the drilling process of one well.

Figure 2:
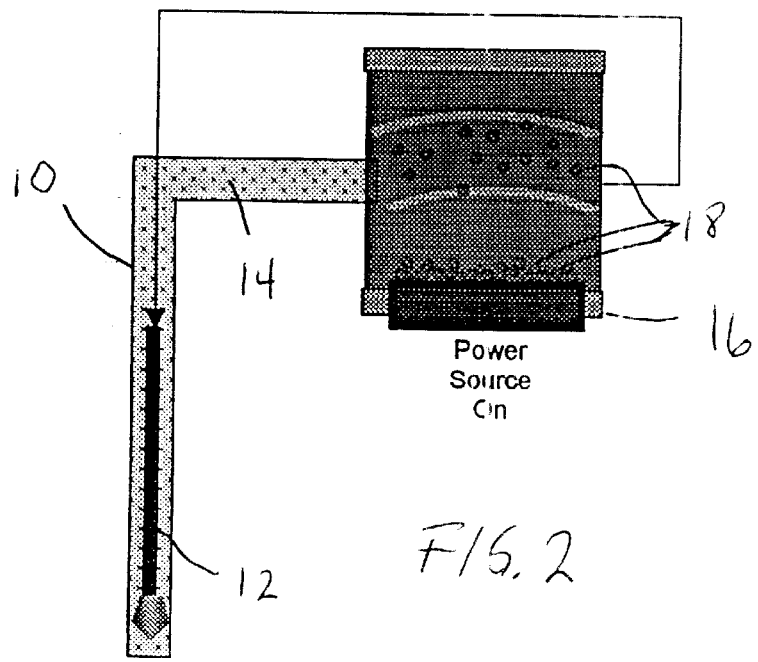
FIG. 2 illustrates a recovering step wherein drilling fluid additive is recovered in accordance with the present invention.

When it is desired to remove the nanoparticles from fluid 14, magnetic field generator 16 can be energized as shown in FIG. 2, such that clusters 18 are attracted to and collected by magnetic field generator 16 from where they can readily be removed, added to and/or re-used for treating subsequent drilling fluids as desired. This results in the drilling fluid being changed to a density state required to control subsurface pressures and to support, preserve and protect the drilled hole until a casing is run and cemented. In the embodiment illustrated in FIGS. 1 and 2, the clustered superparamagnetic nanoparticles have been added to provide a high density fluid which is used during drilling in FIG. 1, and removal of such particles as shown in FIG. 2 returns the drilling fluid to the original density state.

The step of exposing drilling fluid containing clusters of the superparamagnetic nanoparticles to a magnetic field can advantageously be used to recover more than 90% of the original clusters of nanoparticles, thereby significantly reducing the amount of materials used in adjusting fluid density during drilling, and further completely avoiding the substantial amounts of solid and liquid waste material generated during drilling processes utilizing conventional densifiers and other fluid treatment additives which cannot be recovered.

In accordance with the present invention, the superparamagnetic nanoparticles are added to drilling fluid in clusters to make them responsive to the magnetic field. The nanoparticles themselves are preferably provided having an average particle size of between about 0.5 and about 200 nm, and are formed into clusters having an average size of between about 0.1 microns and about 500 microns. Clusters can be formed by any number of mechanisms known in the art. For example, the clusters can be formed by incorporating the nanoparticles into a matrix of glass or ceramic. Alternatively, microparticles can be coated with the nanoparticles or the nanoparticles can be agglomerated to form the clusters.

Suitable materials for the superparamagnetic nanoparticles in accordance with the present invention, include Group VIII metals, Cd, Au, and their alloys. These types of materials have been found to provide excellent results in adjusting fluid density in a reversible manner, wherein the clusters of nanoparticles are readily recoverable.

In accordance with a further embodiment of the present invention, it may be desirable to position equipment for generating magnetic fields in a downhole location, whereby nanoparticles in drilling fluid which permeates the formation can be recovered as well.

While the present disclosure has been made in terms of treating drilling fluid for adjusting fluid density, and wherein this is a particularly preferred embodiment of the present invention, it should readily be appreciated that the method of the present invention could be used to alter other fluid characteristics, and could also be used to allow nanoparticles to be used as carriers for conveying other additive materials into the fluid and/or downhole locations of the well.

It should also be readily appreciated that a substantial source of cost and undesirable waste product has been completely replaced by the method of the present invention due to avoiding the need for non-reusable density adjusting materials. In a typical conventional well, such materials can result in 20% or more of the total cost of the well drilling process. The advantages of the method of the present invention are therefore readily apparent.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A method for treating a drilling fluid, comprising the steps of:
    providing a drilling fluid;
    providing a drilling fluid additive comprising superparamagnetic nanoparticles;
    adding said drilling fluid additive to said drilling fluid so as to provide a treated drilling fluid wherein said nanoparticles have a particle size of less than or equal to 200 nm; and
    exposing said treated drilling fluid to a magnetic field so as to recover said superparamagnetic nanoparticles.

2. A method for treating a drilling fluid, comprising the steps of:
    providing a drilling fluid;
    providing a drilling fluid additive comprising superparamagnetic nanoparticles wherein said nanoparticles are provided in clusters having an average size of between about 0.1 microns to 500 microns;
    adding said drilling fluid additive to said drilling fluid so as to provide a treated drilling fluid; and
    exposing said treated drilling fluid to a magnetic field so as to recover said superparamagnetic nanoparticles.

3. A method for treating a drilling fluid, comprising the steps of:
    providing a drilling fluid;
    providing a drilling fluid additive comprising superparamagnetic nanoparticles;
    adding said drilling fluid additive to said drilling fluid so as to provide a treated drilling fluid;
    exposing said treated drilling fluid to a magnetic field so as to recover said superparamagnetic nanoparticles wherein said exposing step is carried out at a downhole location so as to recover said nanoparticles; and said treated drilling fluid in a drilling operation to provide a used treated drilling fluid, and conducting said exposing step with said used treated drilling fluid.

4. The method of claim 1, 2 or 3, wherein said adding step is carried out so as to adjust a fluid characteristic of said drilling fluid.

5. The method of claim 4, wherein said fluid characteristic is fluid density.

6. The method of claim 1, 2 or 3, wherein said nanoparticles are formed of a material selected from the group consisting of Group VIII metals, Cd, Au and their alloys.

7. The method of claim 1, 2 or 3, wherein said drilling fluid has an initial density, said treated drilling fluid has a changed density different from said initial density, and said exposing step provides a recovered drilling fluid having a density substantially the same as said initial density.

8. The method of claim 1 or 2, further comprising the step of using said treated drilling fluid in a drilling operation to provide a used treated drilling fluid, and conducting said exposing step with said used treated drilling fluid.

9. The method according to claim 8, wherein said used treated drilling fluid is circulated to a surface level, and said exposing step is carried out at said surface level.

10. The method of claim 2 or 3, wherein said nanoparticles have a particle size of less than or equal to 200 nm.

11. The method of claim 1 or 3, wherein said nanoparticles are provided in clusters having an average size of between about 0.1 microns to 500 microns.

12. The method according to claim 8, wherein said exposing step is carried out at a downhole location so as to recover said nanoparticles.

\* \* \* \* \*